US010221881B1

(12) United States Patent
Robinson et al.

(10) Patent No.: US 10,221,881 B1
(45) Date of Patent: Mar. 5, 2019

(54) FASTENER RETAINERS, THUMB NUT RETAINER ASSEMBLIES, POWER DISTRIBUTION ENCLOSURE ASSEMBLIES, AND CONNECTION METHODS

(71) Applicant: Siemens Industry, Inc., Alpharetta, GA (US)

(72) Inventors: Kristopher Scott Robinson, Atlanta, GA (US); Brian J. Rusch, Suwanee, GA (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 0 days.

(21) Appl. No.: 15/718,858

(22) Filed: Sep. 28, 2017

(51) Int. Cl.
*F16B 37/04* (2006.01)
*H02B 1/30* (2006.01)

(52) U.S. Cl.
CPC .............. *F16B 37/044* (2013.01); *H02B 1/30* (2013.01)

(58) Field of Classification Search
CPC .. F16B 37/044; F16B 37/0807; F16B 41/002; H02B 1/30
USPC ........................................................ 411/999
See application file for complete search history.

(56) References Cited

U.S. PATENT DOCUMENTS

| | | | | |
|---|---|---|---|---|
| 2,780,264 A * | 2/1957 | Aspey | .................... | F16B 5/0208 411/85 |
| 3,056,639 A * | 10/1962 | Caminker | .............. | A47B 47/03 312/108 |
| 3,490,509 A * | 1/1970 | Otteson | .................... | F16B 5/025 411/350 |
| 3,498,655 A * | 3/1970 | Arms | ..................... | F16B 5/0291 217/65 |
| 4,031,935 A * | 6/1977 | Jones | ..................... | F16B 35/06 411/103 |
| 4,316,675 A * | 2/1982 | Melicque | .............. | F16B 37/044 403/22 |
| 4,643,319 A * | 2/1987 | Debus | ..................... | H02B 1/01 211/182 |
| 4,747,738 A * | 5/1988 | Duran | ................... | F16B 5/0208 411/107 |
| 5,938,302 A * | 8/1999 | Anderson | ............ | A47B 96/145 312/198 |
| 2006/0180116 A1 * | 8/2006 | Vaandrager | ........ | F01M 11/0004 123/195 A |
| 2006/0188357 A1 * | 8/2006 | Rowe | .................... | F16B 37/044 411/119 |
| 2007/0258786 A1 * | 11/2007 | Orszagh | ................ | F16B 37/044 411/34 |

(Continued)

FOREIGN PATENT DOCUMENTS

| | | | | | |
|---|---|---|---|---|---|
| WO | WO-2014015930 A1 * | 1/2014 | ......... | E05B 63/0056 |
| WO | WO-2014177237 A1 * | 11/2014 | ............. | E05C 3/042 |
| WO | WO-2017020921 A1 * | 2/2017 | ............. | F16B 37/044 |

*Primary Examiner* — Hanh V Tran (57) ABSTRACT

A fastener retainer for one or more thumb nuts. The fastener retainer includes a retainer body including a first retaining surface and a second retaining surface opposed to the first retaining surface and configured to form an open-sided retaining feature that allows a thumb nut to rotate therein and translate along an axial axis, yet restrains the thumb nut from lateral motion and allows finger and thumb access via side openings of the open-sided retaining feature to turn the thumb nut. Enclosure assemblies, thumb nut retainer assemblies, and methods of connecting enclosures are disclosed, as are other aspects.

11 Claims, 9 Drawing Sheets

(56) References Cited

U.S. PATENT DOCUMENTS

| | | | |
|---|---|---|---|
| 2008/0292425 A1* | 11/2008 | Pineiros | F16B 37/044 411/92 |
| 2010/0232904 A1* | 9/2010 | Martinsson | B27B 17/14 411/342 |
| 2012/0174765 A1* | 7/2012 | Kunda | F16B 5/025 89/36.08 |
| 2013/0341460 A1* | 12/2013 | Warren | B64D 45/02 244/1 A |
| 2015/0068048 A1* | 3/2015 | Yoneyama | F16B 41/002 30/383 |
| 2015/0308479 A1* | 10/2015 | Brown | F16B 19/05 411/361 |
| 2016/0020584 A1* | 1/2016 | Zhang | H02B 1/03 361/660 |
| 2016/0153482 A1* | 6/2016 | Boedot | F16B 5/0208 403/342 |
| 2016/0164268 A1* | 6/2016 | Yang | H02B 1/30 361/611 |
| 2016/0169264 A1* | 6/2016 | Genick, II | F16B 37/044 29/525.02 |
| 2016/0223133 A1* | 8/2016 | Peters | F16M 13/02 |
| 2016/0363153 A1* | 12/2016 | Lakoduk | F16B 35/00 |
| 2017/0175797 A1* | 6/2017 | Kawamura | F16B 37/00 |
| 2018/0216653 A1* | 8/2018 | Ramsauer | F16B 37/044 |

* cited by examiner

FASTENER RETAINERS, THUMB NUT RETAINER ASSEMBLIES, POWER DISTRIBUTION ENCLOSURE ASSEMBLIES, AND CONNECTION METHODS

FIELD

The present disclosure relates to apparatus, assemblies, and methods for connecting together enclosures such as electrical power distribution enclosures.

BACKGROUND

Existing power distribution systems for multi-unit buildings can include one or more stacks of power distribution enclosures, such as meter socket panels configured to receive utility meters, main panel enclosures adapted to contain a main circuit breaker, and possibly a tap enclosure configured to pass power to other floors, areas, or other subpanels of the building.

To minimize the overall size of the assemblies of enclosures, the connections between enclosures have been developed wherein the enclosures are abutted, side-by-side in a contacting configuration. Existing systems for connecting the enclosures together are cumbersome. Moreover, sealing between the enclosures is desired, especially for outside installations exposed to the weather. Thus, there is a need for improvements in methods and apparatus configured for connecting together enclosures of power distribution systems.

SUMMARY

According to a first aspect, a fastener retainer is provided. The fastener retainer includes a retainer body including a first retaining surface and a second retaining surface opposed to the first surface and configured to form an open-sided retaining feature that allows a thumb nut to rotate therein and translate along an axial axis, yet restrains the thumb nut from lateral motion and allows finger and thumb access to the thumb nut via side openings of the open-sided retaining feature.

According to another aspect, a thumb nut retention assembly is provided. The thumb nut retention assembly includes a thumb nut, and a retainer body including a first retaining surface and a second retaining surface opposed to the first surface and configured to form an open-sided retaining feature that allows the thumb nut to rotate therein and translate along an axial axis, yet restrains the thumb nut from lateral motion and allows finger and thumb access to the thumb nut via side openings of the open-sided retaining feature.

In another aspect, an enclosure assembly is provided. The enclosure assembly includes a first enclosure including a first sidewall, a second enclosure including a second sidewall and including an aperture, a threaded fastener passing through the aperture, and a thumb nut retention assembly, comprising: a thumb nut, and a retainer body coupled to the including a first retaining surface and a second retaining surface opposed to the first surface and configured to form an open-sided retaining feature that allows the thumb nut to rotate therein and translate along an axial axis, yet retains the thumb nut from lateral motion and allows finger and thumb access through side openings of the open-sided retaining feature.

According to yet another aspect, an improved method of connecting enclosures is provided. The method includes providing a first enclosure, providing a second enclosure including a threaded fastener, providing a thumb nut retention assembly, comprising: a thumb nut, and a retainer body coupled to the first enclosure and including a first retaining surface and a second retaining surface opposed to the first surface and configured to form an open-sided retaining feature that allows the thumb nut to rotate therein and translate along an axial axis, yet restrains the thumb nut from lateral motion and allows finger and thumb access to the thumb nut via side openings of the open-sided retaining feature, and rotating the thumb nut causing translation along the axial axis and threading the thumb nut onto the threaded fastener.

Still other aspects, features, and advantages of the present disclosure may be readily apparent from the following description by illustrating a number of example embodiments and implementations, including the best mode contemplated for carrying out the present invention. The present invention may also be capable of other and different embodiments, and its details may be modified in various respects, all without departing from the substance and scope of the present disclosure. The disclosure covers all modifications, equivalents, and alternatives falling within the substance and scope of the claims.

BRIEF DESCRIPTION OF DRAWINGS

The drawings, described below, are for illustrative purposes only and are not necessarily drawn to scale. The drawings are not intended to limit the scope of the disclosure in any way. Wherever possible, the same or like reference numbers will be used throughout the drawings to refer to the same or like parts.

DETAILED DESCRIPTION

Reference will now be made in detail to the example embodiments of this disclosure, which are illustrated in the accompanying drawings. Existing electrical distribution systems for providing electrical power distribution may include tap boxes, main boxes, panel boxes, subpanel boxes, meter boxes, meter combo boxes (each referred to herein as an "enclosure"). Such enclosures include enclosed electrical components, such as panel boards, switches, main circuit breakers, branch circuit breakers, bus bars, utility meters, current and/or voltage monitors, and/or communication modules, and include a back, which may be attached to a structure (e.g., a wall), sidewalls, and a removable cover or lid. Due to space constraints, the assignee of the present disclosure has developed POWER MOD™ modules wherein the space between the connected adjacent enclosures is minimized, thereby eliminating the former conduits that carry electrical cables connecting between the enclosures. The POWER MOD™ modules include a port on sides thereof to allow electrical connection between the components in the respective enclosure through the port in the sidewalls. A quick connect is used to allow such an electrical connection. Around the port may be positioned one or more seals, such as gaskets, in order to seal the port connection from the weather. Also located about the port are attachment fasteners (e.g., screws) passing through holes of one enclosure. Wing nuts are threaded onto and tightened on the screws to draw the adjacent enclosures together and apply pressure to the gaskets to seal the interface surrounding the port. Although adequate for the intended purpose, use of wing nuts as fasteners makes assembly difficult and cumbersome given the tight space constraints and the difficulty in manipulating and starting threading of the wings nut.

The aforementioned problems of prior art electrical power distribution enclosure attachment methods and apparatus are overcome by one or more embodiments of the present disclosure. In particular, the use of the a fastener retainer in the form of a thumb nut retainer allows a thumb nut to be retained relative to the enclosure and the screw thereby allowing ease of threading of a thumb nut onto the fastener. In particular, the fastener retainer comprises a thumb nut retainer including a retainer body configured to be attached to the enclosure, such as to a sidewall of the enclosure by connection features. The retainer body includes a first retaining surface and a second retaining surface opposed to the first surface and configured and cooperative to form an open-sided retaining feature. The open-sided retaining feature allows a thumb nut to rotate therein and translate along an axial axis, yet restrains the thumb nut from lateral motion (in at least one lateral direction, and two lateral directions in some embodiments) and allows finger and thumb access to the thumb nut via side openings of the open-sided retaining feature.

The retainer body may comprise a first support configured to be secured to the enclosure, wherein the first support comprises a suitable connection feature. The connection feature may include a tab including a hole formed there through that is configured to receive an attachment screw. In other embodiments, the connection feature comprises a snap-in element or a weld-on tab.

The retainer body may comprise a post that is configured to receive a threaded portion of the thumb nut thereon. In some embodiments, the post may be formed as a molded polymer extending from an end portion of a retainer body. The post may be a non-threaded post and the thumb nut may be threaded onto the post thus forming threads thereon. In other embodiments, the post may be pre-threaded stud or fastener.

In some embodiments, the retainer body includes two, side-by-side oriented, open-sided retaining features. Thus, two thumb nuts may be positioned in a pre-connection orientation adjacent to a location of two threaded fasteners extending through an enclosure and thereby enable a quick securement of the thumb nuts to the fasteners and of the enclosures to one another. Moreover, this configuration may allow rapid sealing of the interface between the adjacent enclosures. Accordingly, embodiments of the disclosure provide a compact and efficient method and apparatus for connecting together two or more enclosures.

In some embodiments, four fasteners are provided around each port and four thumb nut retainers including open-sided retaining features may be employed to pre-position the thumb screws thereto. In some embodiments, two dual thumb nut retention assemblies may be used, one on each side of the port. Various embodiments of the fastener retainers, thumb nut retention assemblies, and enclosure assemblies and methods will be explained in greater detail with reference to FIGS. 1A-7 below.

Figure 1A:
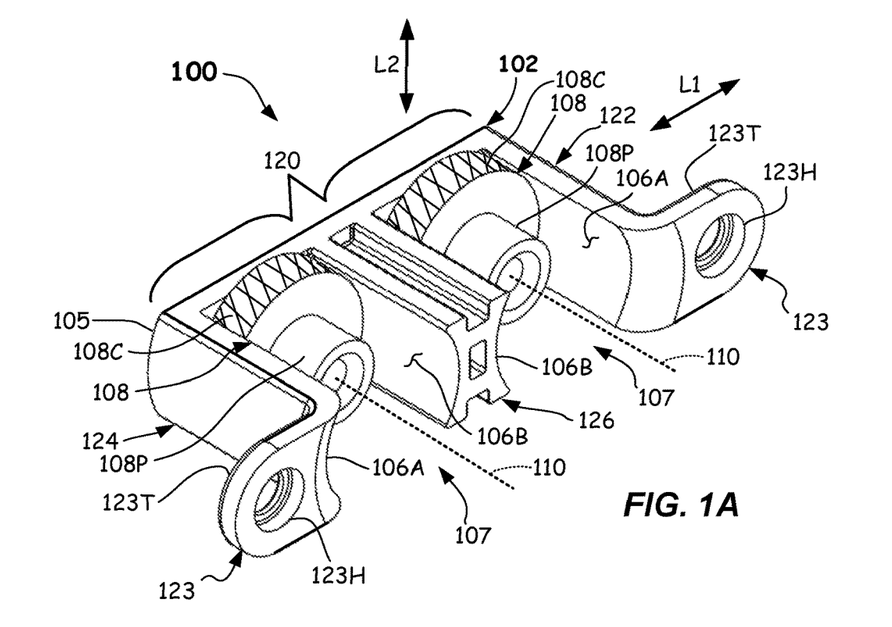
FIG. 1A illustrates an isometric view of a thumb nut retention assembly including dual thumb nuts according to one or more embodiments.
Figure 1B:
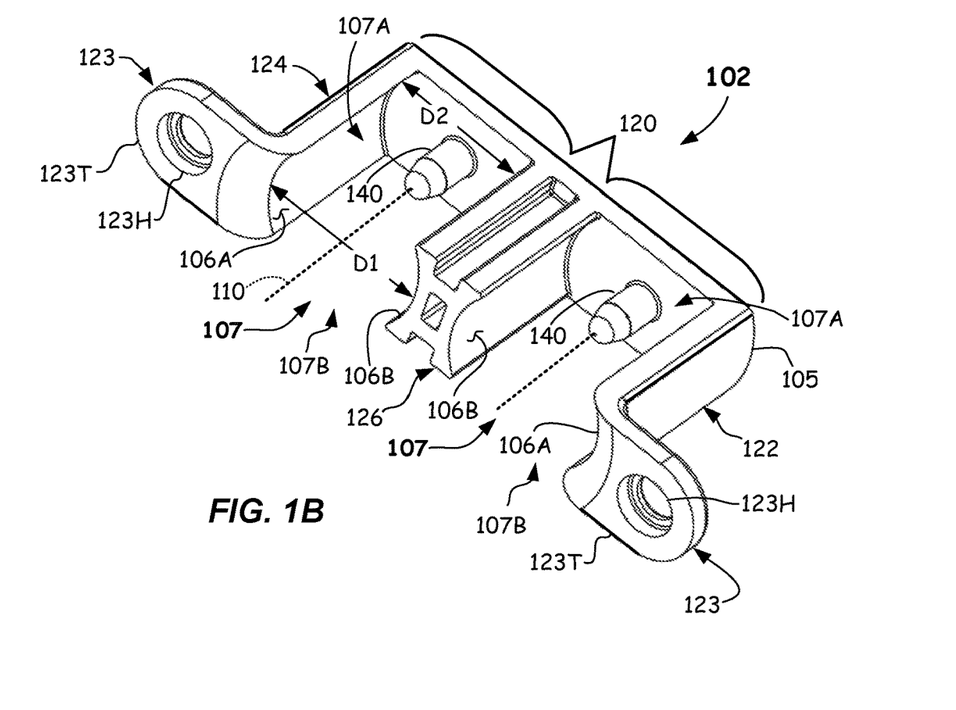
FIG. 1B illustrates an isometric view of a fastener retainer embodied as a dual thumb nut retainer according to one or more embodiments.

FIGS. 1A-1B illustrate a first embodiment of a fastener retainer 100 embodied as a dual thumb nut retainer. The fastener retainer 100 comprises a retainer body 105 including a first retaining surface 106A and a second retaining surface 106B positioned in an opposed relationship to the first retaining surface 106A and configured to form an open-sided retaining feature 107. The open-sided retaining feature 107 allows a thumb nut 108 to rotate therein and also translate along an axial axis 110, yet restrains the thumb nut 108 from lateral motion (e.g., in at least one lateral direction, and in two lateral directions perpendicular to one another in the embodiment shown). The open-sided retaining feature 107 allows finger and thumb access to the thumb nuts 108 that extend laterally through side openings 107A, 107B of the open-sided retaining feature 107. As shown, the retainer 100 comprises two side-by-side open-sided retaining features 107 configured to receive and retain two side-by-side oriented thumb nuts 108. As will be apparent, the fastener retainer 100 retains the thumb nuts 108 in position during assembly. This configuration allows one fastener retainer 102 to position and align the thumb nuts 108 with two fasteners as best shown in FIG. 1C.

The first retaining surface 106A and a second retaining surface 106B opposed to the first retaining surface 106A that are configured to form an open-sided retaining feature 107 may comprise opposed and truncated cylindrical surfaces. The first retaining surface 106A and a second retaining surface 106B may include, as shown in FIG. 1B) a first dimension D1 of between about 0.5 inches (12.7 mm) and about 1.0 inch (25.4 mm), and that may be slightly larger than an outside dimension of a contact portion 108C of the thumb nut 108, such that it can rotate freely therein. The open-sided retaining feature 107 may include a second dimension D2 (the lateral opening dimension) that is smaller than the first dimension D1 so as to laterally restrain the thumb nut 108 from falling out laterally. Thus, in the depicted embodiment, the thumb nut 108 is restrained laterally in two lateral directions, along a first lateral direction L1 extending through the first and second supports 122, 124, and along a second lateral direction L2 perpendicular thereto. Thus, the thumb nuts 108 are constrained to move axially within the open-sided retaining feature 107 as they are moved (e.g., threaded) off of the post 140 and onto the fasteners 135.

Figure 1C:
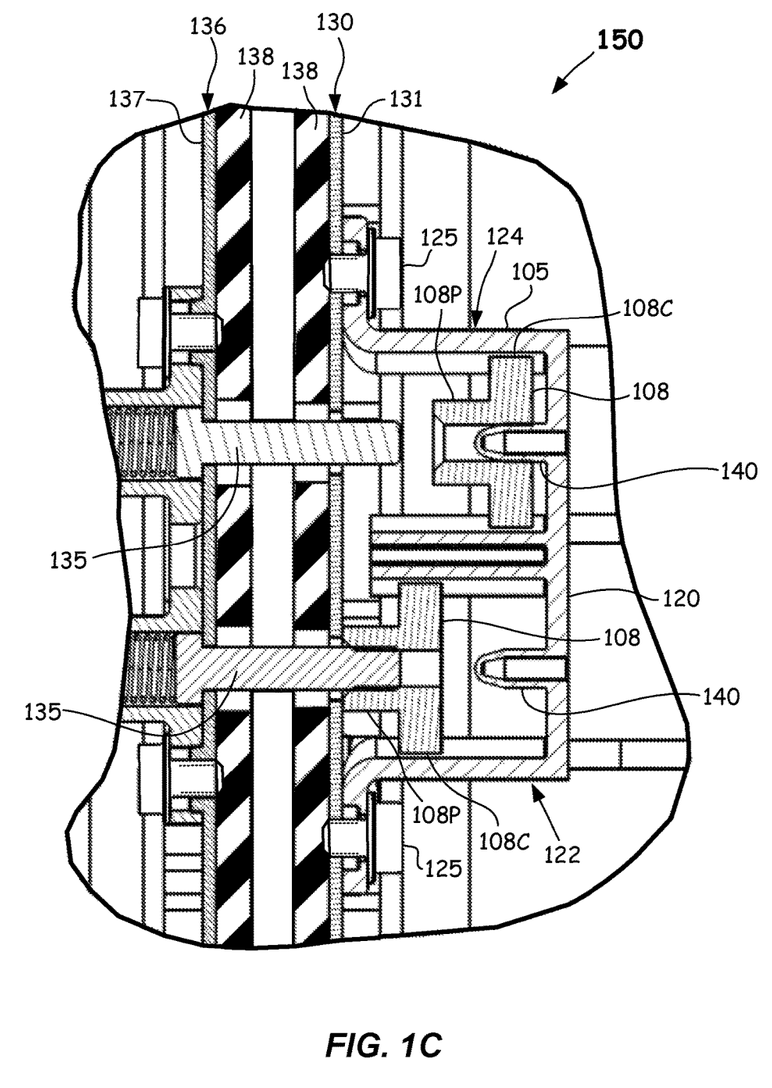
FIG. 1C illustrates a partial cross-sectioned side view of a fastener retainer installed in an enclosure assembly according to one or more embodiments.

In more detail, and as shown in FIGS. 1A-1C, the retainer body 105 comprises and end portion 120 and a first support 122 extending therefrom (e.g., perpendicularly therefrom) and configured to be secured to a first enclosure 130 (such as to a portion of a sidewall 131 of the enclosure 130 shown). The fastener retainer 100 may be used as part of an enclosure assembly 150 as shown in FIG. 1C. The retainer body 105 may also comprise a second support 124, which may also be configured to be secured to the enclosure 130 in some embodiments at a location spaced from a location where the first support 122 is attached. The second support 124 may also extend from the end portion 120 (e.g., perpendicularly from an end thereof). The retainer body 105 may include a third support 126 upon which the second retaining surfaces 106B may be formed. In the depicted embodiment, a first open-sided retaining feature 107 is formed by the first support 122 and the third support 126 and a second open-sided retaining feature 107 is formed by the second support 124 and the third support 126.

In the depicted embodiment of FIGS. 1A-1C, the first support 122 comprises a connection feature 123. The connection feature 123 is configured to secure the fastener retainer 102 to the first enclosure 130. In particular, in the disclosed embodiment, the connection feature 123 can be a tab 123T, which may include a hole 123H formed there through. The tab 123T may comprise a laterally-extending planar portion that extends substantially perpendicularly from a leg portion of the first support 122 that extends substantially perpendicularly away from the end portion 120. The hole 123H may be appropriately sized to receive a fastener 125 (FIG. 1C) therein, which may thread into a hole in the sidewall 131. The fastener 125 may be a self-threading screw, or the like, for example. Optionally, the hole in the sidewall 131 may be threaded. Other fasteners for attachment to the sidewall may be used, such as a rivet, or the like. An identical connection feature 122A may be included on the second support 124, as shown. In the depicted embodiment, the retainer body 105 may be made of a polymer material, such as a moldable plastic (e.g., a Nylon, or other engineered plastic material). The retainer body 105 may be formed by injection molding or the like. Other suitable materials may be used, such as steel, aluminum, or rubber.

As shown in FIGS. 1A and 1C, a thumb nut 108 is first installed in an unconnected configuration (top thumb nut of FIG. 1C) wherein the thumb nut 108 is unconnected to the fastener 135, but is aligned axially therewith as the fastener retainer assembly 100 is installed initially to the first enclosure 130. As is shown in FIG. 1C, the thumb nut 108 may be initially received (e.g., threaded or otherwise secured) onto a post 140. The post 140 functions to hold the thumb nut 140 in a defined orientation and axial position relative to the sidewall 131. The post aligns the nut axis along the axial axis 110 so that it also aligns axially with the fastener 135. The post 140 may be centered in the open-sided retaining features 107 and aligned along the axial axis 110. The axial axis 110 is an axis that when installed to the enclosure will substantially align with the fastener. Some slight misalignment (e.g., 1-3 mm) could be present without losing the prepositioning advantage.

As shown in FIG. 1C, a second enclosure 136 includes a sidewall 137 through which the fasteners 135 may be inserted. The fasteners 135 may be held in place by a spring assembly as is described in U.S. Pat. No. 8,016,529, which is hereby incorporated by reference herein in its entirety for all purposes. Optionally, the fasteners 135 may be held in place by the installer or any other suitable holding mechanism. Optionally, the fasteners may be studs extending from the sidewall 137 of the second enclosure 136.

One or more seals 138, such as gaskets shown, may be provided between the sidewalls 131, 137 of the first enclosure 130 and second enclosure 136 (two are shown, but one may be sufficient). The one or more seals 138 act to seal between the sidewalls 131, 137 of the first enclosure 130 and second enclosure 136 when the thumb nuts 108 are fully threaded onto the fasteners 135. The post 140 is configured to receive a threaded portion of a thumb nut 108 thereon. As shown, two posts 140 that are oriented along the axial axis 110 are provided. The posts 140 may extend from the end portion 120 and may be formed as unthreaded cylinders in some embodiments. The end of the post 140 may be tapered to facilitate ease of assembly of the thumb nut 108 to the post 140. Threading the thumb nuts 108 onto the post 140 may form threads thereon by deforming the plastic surface of the post 140 in some molded embodiments. However, in some embodiments, only a slight interference is provided between the post 140 and the thumb nut threaded portion (the post is unthreaded) such that the thumb nut 108 may be rotated and slid axially to make contact with the end of the fastener 135 where it can then be threaded thereon. In other embodiments, the posts 140 may be pre-threaded. The posts may be between about 0.25 inch (6.4 mm) and about 1.0 inch (25.4 mm) long and between about 0.125 inch (3.2 mm) and about 0.25 inch (6.4 mm) in diameter, for example. They may be threaded with a ¼-20 thread, for example. Other dimensions and thread sizes may be used. The thumb nuts 108 may include a contact portion 108C, which may be of a large diameter (e.g., about 0.75 inch (19 mm)) and may be knurled on the outer diameter periphery in some embodiments. The contact portion 108C is contactable by the installers thumb and forefinger and the knurling may increase friction there against. The thumb nut 108 may also include a pilot portion 108P of a relatively smaller diameter that functions to space the contact portion 108C from the sidewall 131. The pilot portion 108P may include a length of about 0.25 inch (6.4 mm), for example. The thumb nut 108 includes a threaded bore, which may be threaded along at least some and preferably all of its length. Other suitable sizes and threads may be used.

In operation, the installer uses their thumb and forefinger to turn the thumb nuts 108 and move (e.g., thread) the thumb nuts 108 off from the posts 140 and onto the fasteners 135 as shown the connected configuration (see lower thumb nut 108 in FIG. 1C). The thumb nuts 108 are then turned further to draw the first enclosure 130 and second enclosure 136 towards one another and thereby draw the gaskets 138 into contacting and sealing engagement. The enclosure assembly 150 as shown in FIG. 1C may be included on either side of a port formed by like aligned passages through each of the sidewalls 131, 137, wherein the port is configured and adapted to allow electrical connection between bus bars provided in each of the enclosures 130, 136 and sealing there around.

Figure 2A:
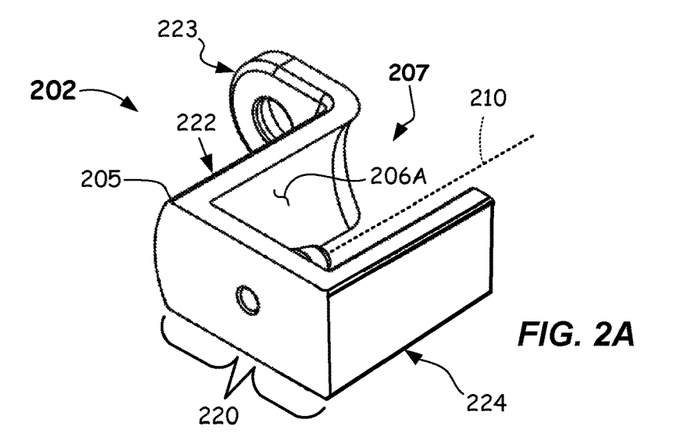
FIGS. 2A-2B illustrate isometric views of an alternative fastener (thumb nut) retainer according to one or more embodiments.
Figures 2B, 2C:
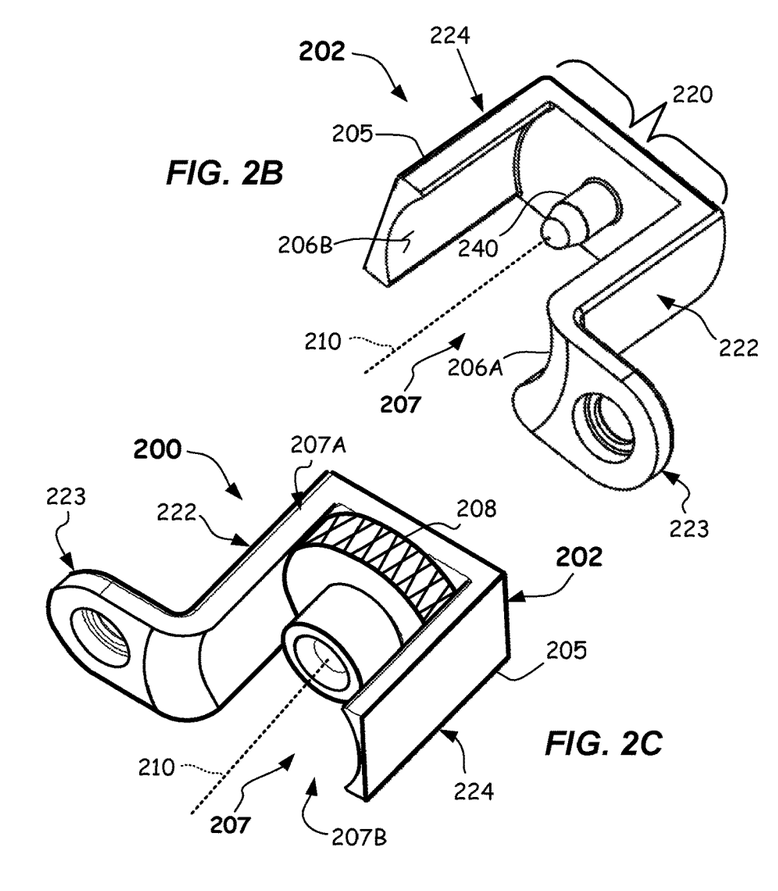
FIG. 2C illustrates an isometric view of a thumb nut retainer assembly according to one or more embodiments.

FIGS. 2A-2C illustrate another embodiment of fastener retainer 202 and thumb nut assembly 200. As before, the fastener retainer 202 includes a retainer body 205 including an end portion 220, a first support 222 and a second support 224 extending therefrom, such as generally perpendicularly therefrom. At least one of the supports (e.g., the first support 222 or second support 224) comprises a connection feature 223, which as shown is identical to connection feature 123 described above. As above, a post 240 depends from the end portion 220 along an axial axis 210 upon which the thumb nut 108 is received. As above, the post 240 may include a tapered end thereon. As before, first retaining surface 206A and a second retaining surface 206B and opposed open sides 207A, 207B form a single open-side retention feature 207 configured to receive a thumb nut 108 therein. Up to four of the thumb nut assemblies 200 may be used for securing around a port extending between connected enclosures (e.g., 130, 136), for example.

Figures 2D, 2E:
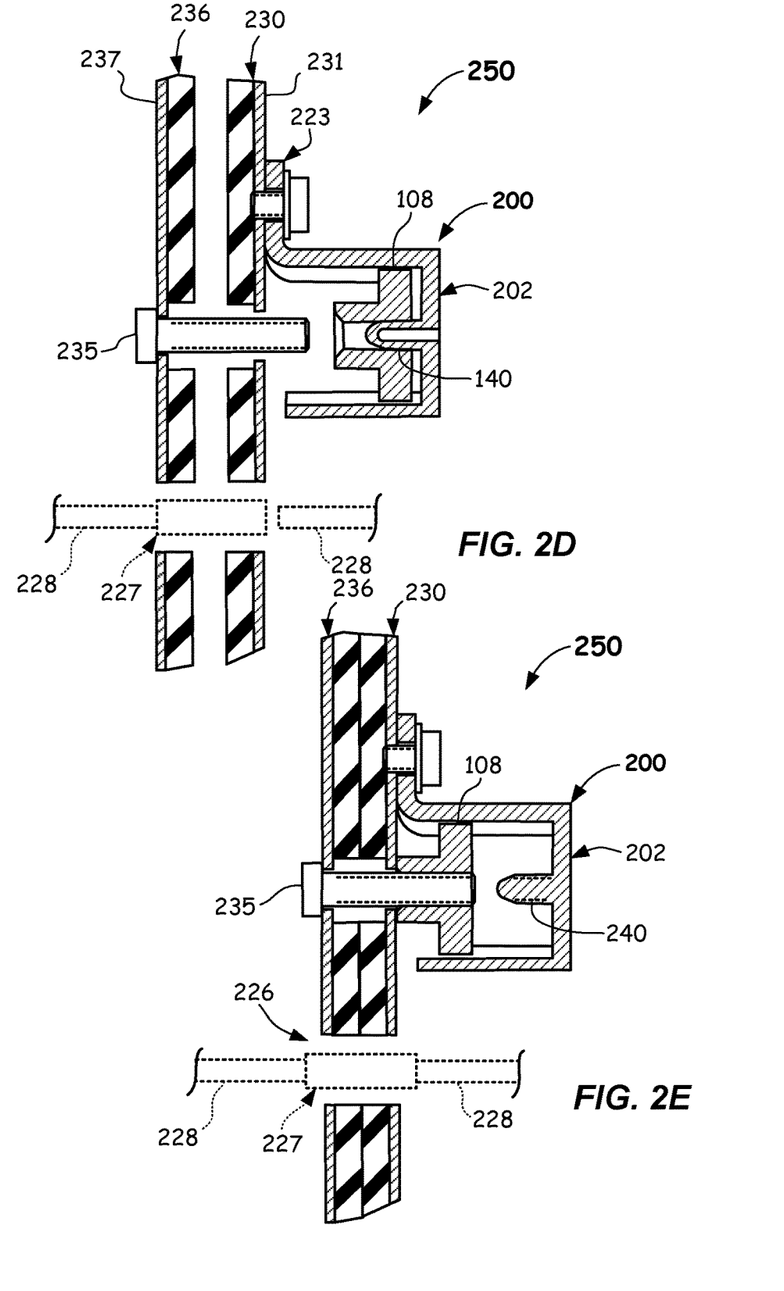
FIGS. 2D and 2E illustrate partial, cross-sectioned side views of an enclosure assembly including the thumb nut retention assembly shown in a pre-connection orientation (FIG. 2D) and in a connected orientation (FIG. 2E) according to one or more embodiments.

FIGS. 2D and 2E show unconnected and connected orientations, respectively, of the thumb nut assembly 200 in an enclosure assembly 250. FIG. 2D illustrates the unconnected configuration where the thumb nut 108 is received on the post 240 of the fastener retainer 202. The thumb nut assembly 200 is secured to a sidewall 231 of a first enclosure 230 by connection features 223. FIG. 2E illustrates the connected configuration where the thumb nut 108 is removed off of the post 240 (e.g., threaded off) of the fastener retainer 202 body and threaded onto the fastener 235. The thumb nut 108 may be further threaded onto the fastener 235 to draw the first enclosure 230 and second enclosure 236 together and seal there between and about a port 226. The port 226 is an opening that is configured to facilitate an electrical bus connection 227 between electrical components (e.g., one or more bus bars 228) received in the respective enclosures 230, 236. The electrical bus connection 227 may be a quick connector of any suitable construction. For example, the electrical bus connection 227 to one or more bus bars may be made by any suitable connector, such as a QUICK CONNECT™ connector available from Siemens Corporation. Connection may be between any two types of enclosures, such as to a main panel enclosure to meter stack enclosure, meter stack enclosure to meter stack enclosure, tap enclosure (tap box) to main panel enclosure, switch panel to meter combo panel, and any other modular panel, for example. The electrical bus connection 227 to the respective bus bars may be optionally as described in U.S. Pat. No. 3,104,276; U.S. Pat. No. 3,183,298; U.S. Pat. No. 3,909,098; and U.S. Pat. No. 5,466,889, the disclosures of which are hereby incorporated by reference herein in their entirety.

Figures 3A, 3B:
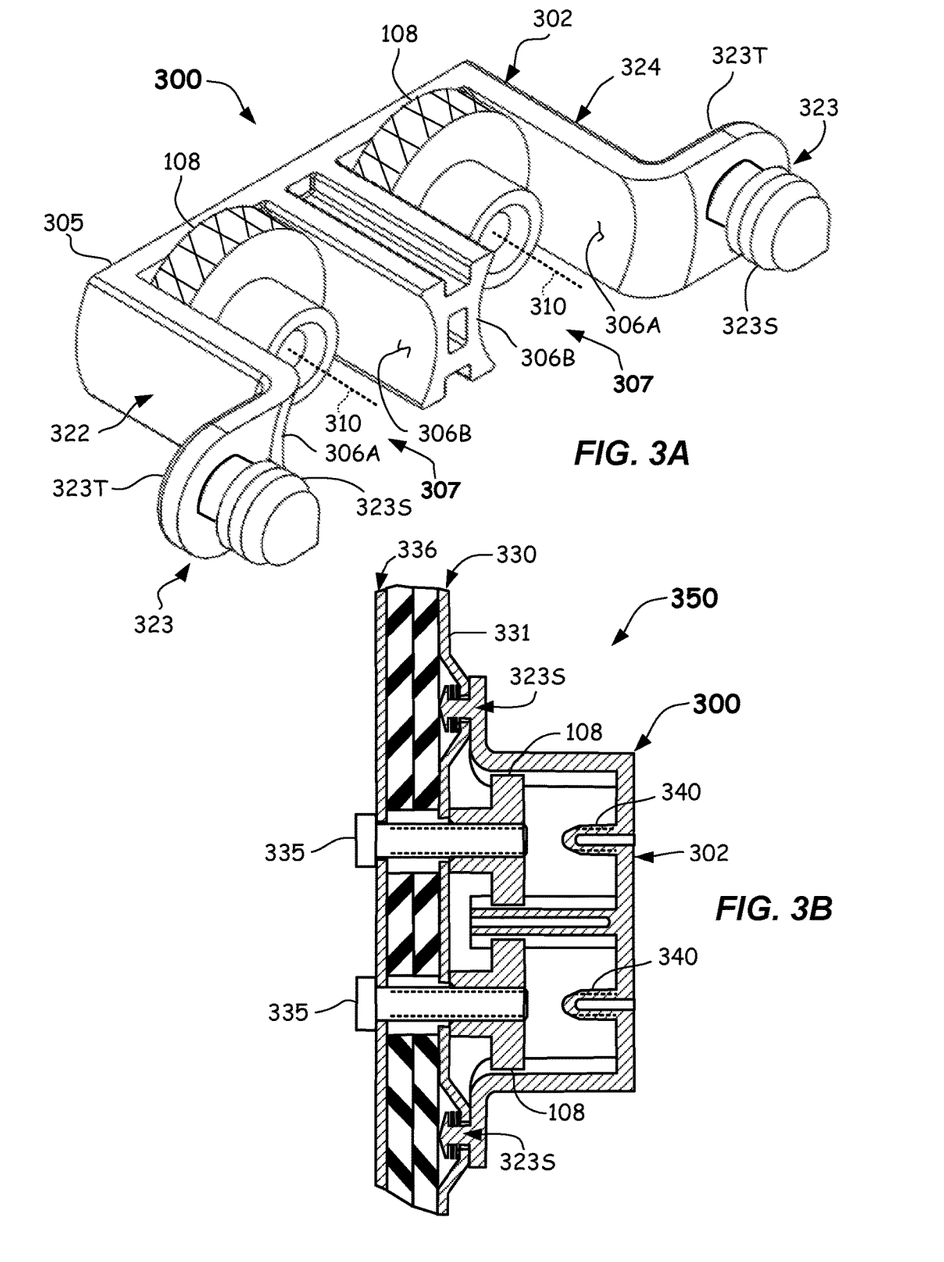
FIG. 3A illustrates an isometric view of an alternative thumb nut retention assembly including snap-fit connection features according to one or more embodiments.
FIG. 3B illustrates a partial, cross-sectioned side view of a thumb nut retention assembly including snap-fit connection features shown included in an enclosure assembly and in a connected orientation according to one or more embodiments.

FIGS. 3A-3B illustrate another embodiment of thumb nut retainer assembly 300 including a fastener retainer 302 and dual thumb nuts 108 and including the construction as described with reference to FIG. 1A-1B above, except that the connection features 323 include snap-in elements 323S. The snap-in elements 323S may depend from tabs 323T formed on the end of the first and second supports 322, 324 of the retainer body 305 as shown. Snap-in elements 323S include one or more ribs or other like flexible elements that may flex and pass through an aperture formed in a sidewall 331 of the enclosure 330, and then expand back to (or near) their initial dimension such that they can be snapped into the aperture and secure the fastener retainer 302 to the enclosure 330. In the embodiment of enclosure assembly 350 shown in FIG. 3B, the fastener retainer 302 is secured to the first enclosure 330 by inserting the snap-in elements 323S into apertures pre-formed through raised indented regions in the sidewall 331 of the enclosure 330. The embodiment of FIG. 3B shows the thumb nuts 108 threaded off from the posts 340 and onto the fasteners 335 and then further tightened to provide a sealed interface between the first enclosure 330 and the second enclosure 336.

Figure 4A:
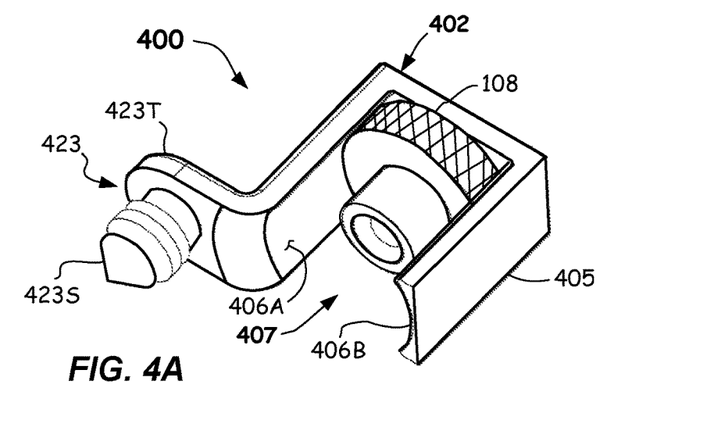
FIG. 4A illustrates an isometric view of an alternative thumb nut retention assembly according to one or more embodiments.
Figure 4B:
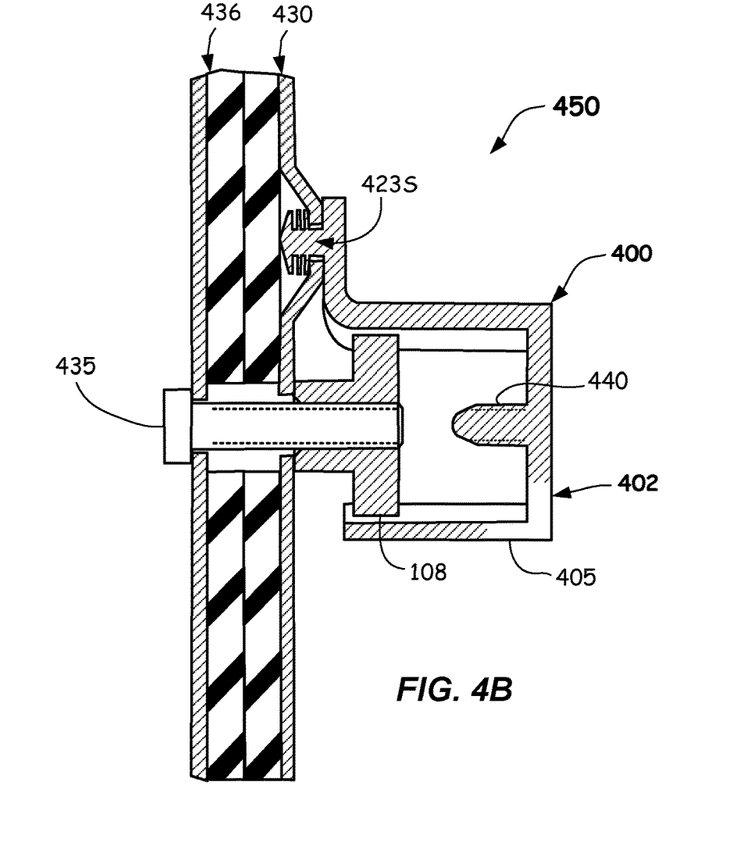
FIG. 4B illustrates a partial, cross-sectioned side view of a thumb nut retention assembly including a snap-fit connection feature shown in an enclosure assembly in a connected orientation according to one or more embodiments.

FIGS. 4A-4B illustrates an embodiment of thumb nut retainer assembly 400 including a fastener retainer 402 and a single thumb nut 108 and including the construction of the retainer body 405 as described with reference to FIG. 2A-2C above, except that the connection features 423 in this embodiment includes a snap-in element 423S that may extend from a tab 423T in the same manner described in reference to FIGS. 3A-3B. FIG. 4B illustrates the enclosure assembly 450 shown in a connected configuration wherein the thumb nut 108 is threaded off from the post 440 and onto the fastener 425 and further turned to secure together a first enclosure 430 and a second enclosure 436.

Figure 5A:
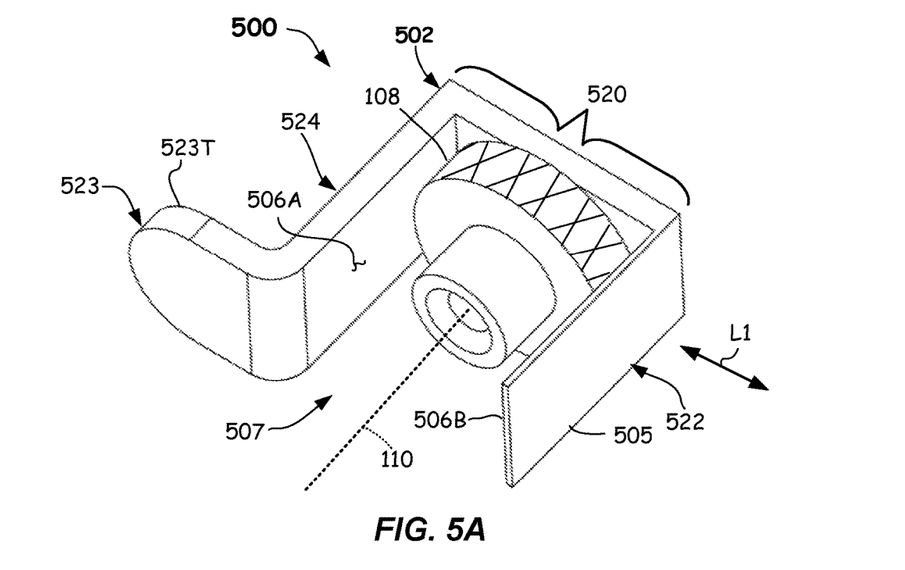
FIG. 5A illustrates an isometric view of an alternative thumb nut retention assembly including a weld-on tab connection feature according to one or more embodiments.
Figure 5B:
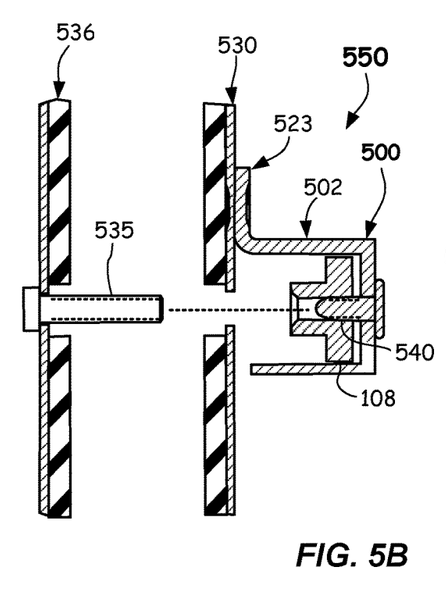
FIGS. 5B and 5C illustrate partial, cross-sectioned side views of the alternative thumb nut retention assembly included in an enclosure assembly according to one or more embodiments.
Figure 5C:
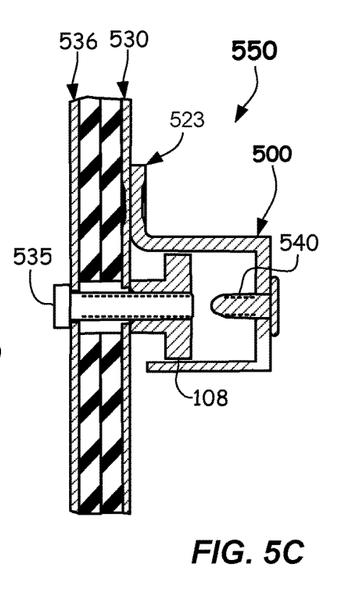

FIGS. 5A-5C illustrates an embodiment of thumb nut retainer assembly 500 including a fastener retainer 502 and a single thumb nut 108 in the open-side retaining feature 507 and including the construction as described with reference to FIG. 2A-2C above, except that the connection features 523 in this embodiment includes a tab 523T that may be welded to the first enclosure 530, such as by spot welding or braising. Other suitable welding methods may be used. Also shown in FIG. 5A is that the first and second retaining surface 506A and 506B comprise planar surfaces (no not include a truncated cylindrical profile thereon). Thus, the thumb nut 108 is restrained in only one lateral direction L1 passing through the first and second supports 522, 524 in this embodiment.

FIGS. 5B and 5C illustrate the enclosure assembly 550 shown in an unconnected configuration (FIG. 5B) and in a connected configuration (FIG. 5C) wherein the thumb nut 108 is threaded off from the post 540 and onto the fastener 535 and further turned to secure together a first enclosure 530 and a second enclosure 536. The post 540 may be a welded stud, staked into, or otherwise formed onto the end portion 520 and may have threads pre-formed thereon prior to receiving the thumb nut 108.

Figure 6:
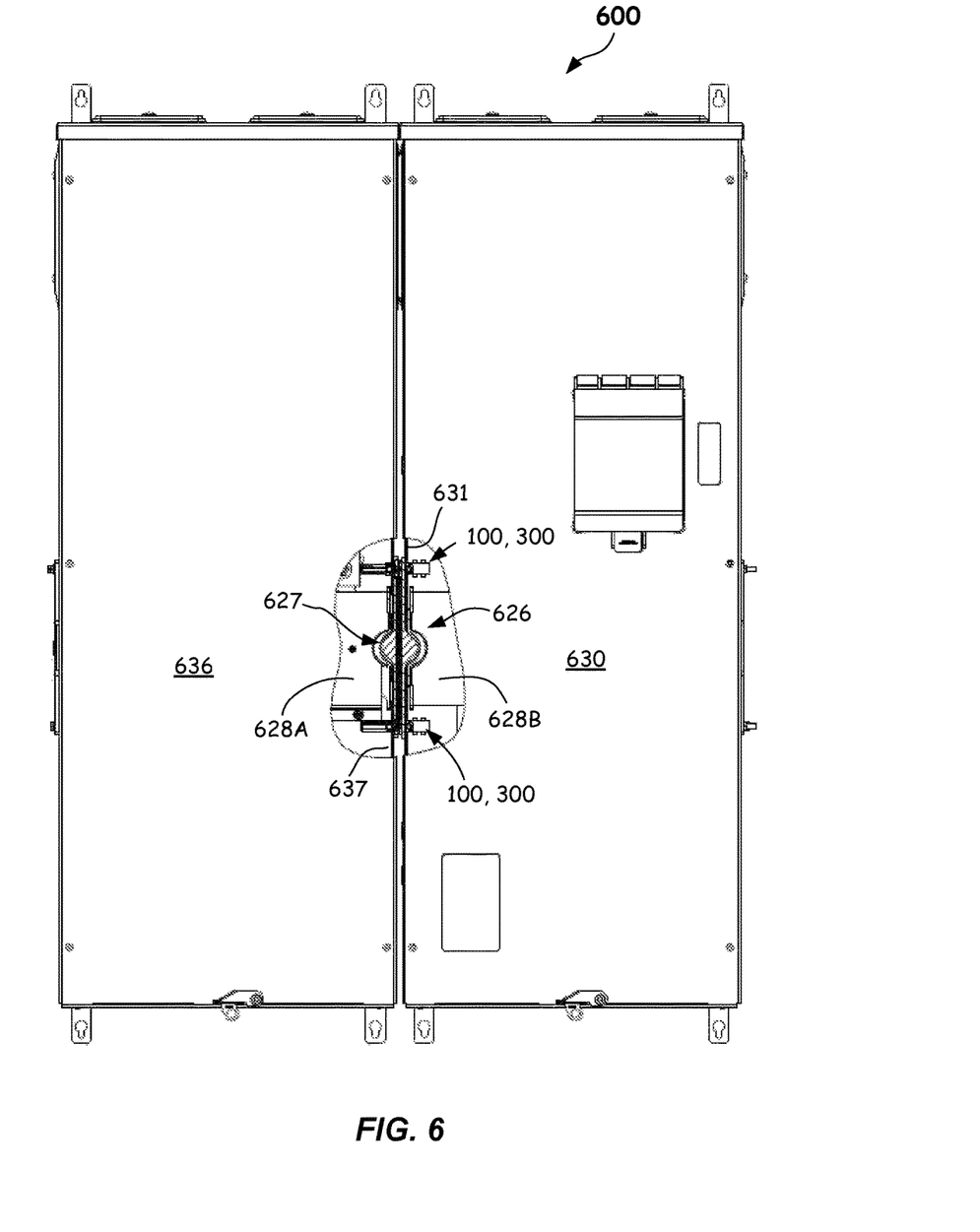
FIG. 6 illustrates a front view of an enclosure assembly including a main enclosure and a tap enclosure including multiple thumb nut retention assemblies according to one or more embodiments.

FIG. 6 illustrates an example embodiment of an enclosure assembly 600. The enclosure assembly 600 includes a main panel enclosure for the first enclosure 630, which may include a main circuit breaker (not shown) housed therein. The enclosure assembly 600 may include a tap enclosure for the second enclosure 636, which may include tap terminals (not shown) included therein enabling electrical connection to other electrical components outside of the second enclosure 636. Each of the enclosures 630, 636 includes sidewalls, a back and a cover or lid and included therein a respective bus assembly 626A, 628B (as shown in the cutout region) containing one or more electrical buses (e.g., A, B, and C phase bus bars and a neutral (N) bus bar). An electrical bus connection 627 in the port 626 is provided to electrically couple together and electrically connect the respective bus assemblies 628A, 628B. Above and below the electrical bus connection 627 and port 626 in the depicted embodiment are thumb nut retainer assemblies 100, 300 (as shown in either of FIG. 1A or 3B). The thumb nut retainer assemblies 100, 300 may be secured to the first enclosure 630. Tightening the thumb nuts 108 thereof draws the enclosure 630, 636 together by exerting a tensile force of fasteners 135, 335.

Other types and numbers of thumb nut retainer assemblies 100, 200, 300, 400, 500 may be used to secure together any two enclosures.

Figure 7:
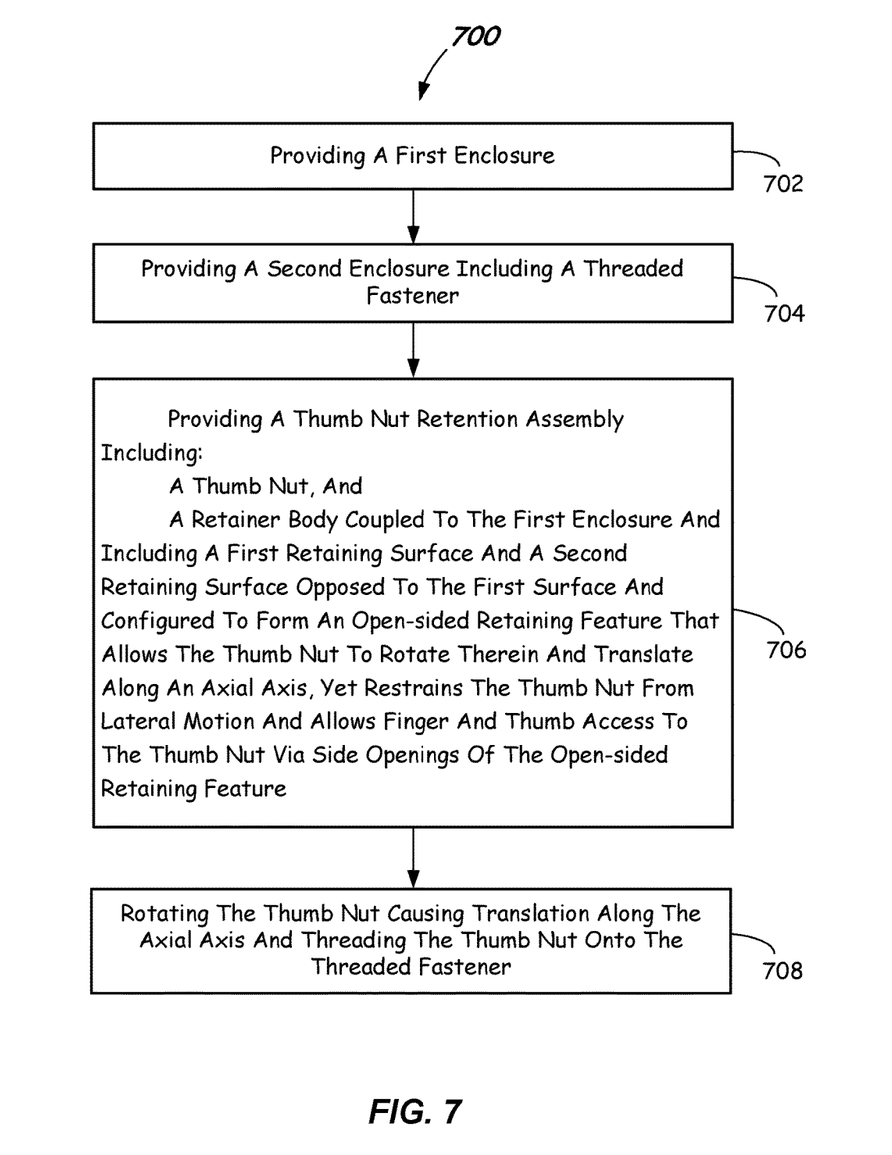
FIG. 7 illustrates a flowchart of a method of connecting enclosures according to embodiments.

FIG. 7 illustrates a method of connecting two enclosures. The method 700 includes, in 702, providing a first enclosure (e.g., first enclosure 130, 230, 330, 430, 530, or 630). The method includes, in 704, providing a second enclosure (e.g., second enclosure 136, 236, 336, 436, 536, or 636) including a threaded fastener (e.g., threaded fastener 135, 235, 335, 435, or 535).

The method 700 further includes, in 706, providing a thumb nut retention assembly (e.g., thumb nut retention assembly 100, 200, 300, 400, or 500), including a thumb nut (e.g., thumb nut 108), and a retainer body (e.g., retainer body 105, 205, 305, 405, 505) coupled to the first enclosure and including a first retaining surface (e.g., first retaining surface 106A, 206A, 306A, 406A, or 506A) and a second retaining surface (e.g., second retaining surface 106B, 206B, 306B, 406B, or 506B) opposed to the first retaining surface and configured to form an open-sided retaining feature (e.g., 107, 207, 307, 407, or 507) that allows the thumb nut to rotate therein and translate along an axial axis (e.g., axial axis 110, 210, 310, 410, or 510) yet restrains the thumb nut from lateral motion and allows finger and thumb access to the thumb nut via side openings (e.g., 107A, 107B,) of the open-sided retaining feature.

The method 700 further includes, in 708, rotating the thumb nut (e.g., thumb nut 108) causing translation along an axial axis and threading the thumb nut onto the threaded fastener.

It should be readily appreciated by those persons of ordinary skill in the art that the present disclosure is susceptible of broad utility and application for quickly attaching any two enclosures (e.g., electrical enclosures). Many embodiments and adaptations of the present disclosure other than those herein described, as well as many variations, modifications, and equivalent arrangements, will be apparent from, or reasonably suggested by, the foregoing description thereof. Accordingly, while the present disclosure has been described herein in detail in relation to specific embodiments, it is to be understood that this disclosure is only illustrative and presents examples of the present invention and is made merely for purposes of providing a full and enabling disclosure. This disclosure is not intended to limited to the particular apparatus, assemblies, and/or methods disclosed herein, but, to the contrary, the intention is to cover all modifications, equivalents, and alternatives falling within the scope of the claims.

What is claimed is:

1. A fastener retainer, comprising:
a retainer body including a first retaining surface and a second retaining surface opposed to the first retaining surface and configured to form an open-sided retaining feature that allows a thumb nut to rotate therein and translate along an axial axis, yet restrains the thumb nut from lateral motion and allows finger and thumb access to the thumb nut via side openings of the open-sided retaining feature, wherein the retainer body comprises a post configured to receive a threaded portion of the thumb nut thereon.

2. The fastener retainer of claim 1, wherein the retainer body comprises a first support configured to be secured to an enclosure.

3. The fastener retainer of claim 2, wherein the first support comprises a connection feature.

4. The fastener retainer of claim 3, wherein the connection feature comprises a tab including a hole formed there through.

5. The fastener retainer of claim 1, wherein the first retaining surface and the second retaining surface are truncated cylindrical surfaces.

6. The fastener retainer of claim 1, wherein the side openings of the open-sided retaining feature includes a maximum dimension D1 between the first retaining surface and the second retaining surface that is greater than an opening dimension D2.

7. A fastener retainer, comprising:
a retainer body including a first retaining surface and a second retaining surface opposed to the first retaining surface and configured to form an open-sided retaining feature that allows a thumb nut to rotate therein and translate along an axial axis, yet restrains the thumb nut from lateral motion and allows finger and thumb access to the thumb nut via side openings of the open-sided retaining feature,
wherein the retainer body comprises an end portion, and a first support and a second support extending from the end portion, wherein the first support includes the first retaining surface and the second support includes the second retaining surface,
wherein the end portion comprises a post configured to receive a threaded portion of the thumb nut thereon.

8. The fastener retainer of claim 7, wherein the post is centered in the open-sided retaining feature.

9. The fastener retainer of claim 7, wherein the post is threaded.

10. A fastener retainer, comprising:
a retainer body including a first retaining surface and a second retaining surface opposed to the first retaining surface and configured to form an first open-sided retaining feature that allows a thumb nut to rotate therein and translate along an axial axis, yet restrains the thumb nut from lateral motion and allows finger and thumb access to the thumb nut via side openings of the open-sided retaining feature; and
an end portion, a first support, a second support, and a third support, each extending from the end portion, wherein the first open-sided retaining feature is formed by the first support and second support, and a second open-sided retaining feature is formed by the second support and the third support.

11. The fastener retainer of claim 10, wherein the first support and the second support each comprise a connection feature configured to secure the fastener retainer to an enclosure.

* * * * *